United States Patent [19]

Buonadonna et al.

[11] 4,115,168
[45] Sep. 19, 1978

[54] CARBON MONOSULFIDE GENERATING PROCESS

[75] Inventors: Victor R. Buonadonna; Ralph J. Richardson; Richard L. Rasmussen; William Q. Jeffers, all of St. Louis County, Mo.

[73] Assignee: McDonnell Douglas Corporation, St. Louis, Mo.

[21] Appl. No.: 623,662

[22] Filed: Oct. 20, 1975

[51] Int. Cl.² ............................................. C06B 23/00
[52] U.S. Cl. .............................. 149/109.6; 149/109.4; 331/94.5 G; 423/439
[58] Field of Search ............................ 423/439, 561 R; 331/94.5 P, 94.5 G; 330/4.3; 60/217, 218; 149/109.4, 109.6

[56] References Cited

U.S. PATENT DOCUMENTS 2,744,380  5/1956  McMillan et al. ................ 423/561 R

OTHER PUBLICATIONS

Stokes et al., "Investigation of Several High Temperature Reactions Involving Cyanogen and Like Compounds as High Brightness Chemical Pyrotechnic Sources", Research Institute of Temple University, Aug. 1968.

Laser Focus, "Gas Dynamic Laser Pumped With Gasoline and Spark Plug", p. 16, Sept. 1971, vol. 7, No. 9.

Jeffers et al., "CO Chemical Laser Directly Fueled by Carbon Monosulfide," Appl. Phys. Lett., vol. 22, No. 11 (1 June 1973), pp. 587-589.

Peu et al., "Determination of Optical Gain for CO Transitions in a $CS_2$-$O_2$ Flame by Oscillation-Range Measurements," Applied Physics Letters, 15 June 1971, pp. 538-540.

Primary Examiner—O. R. Vertiz
Assistant Examiner—Wayne A. Langel
Attorney, Agent, or Firm—Gravely, Lieder & Woodruff

[57] ABSTRACT

This application concerns a process for generating carbon monosulfide (CS) in quantity for a carbon monoxide (CO) chemical laser using thermochemical dissociation of carbon disulfide ($CS_2$) in a high temperature (T ≧ 2400 K) fuel-oxidizer flame.

7 Claims, 1 Drawing Figure

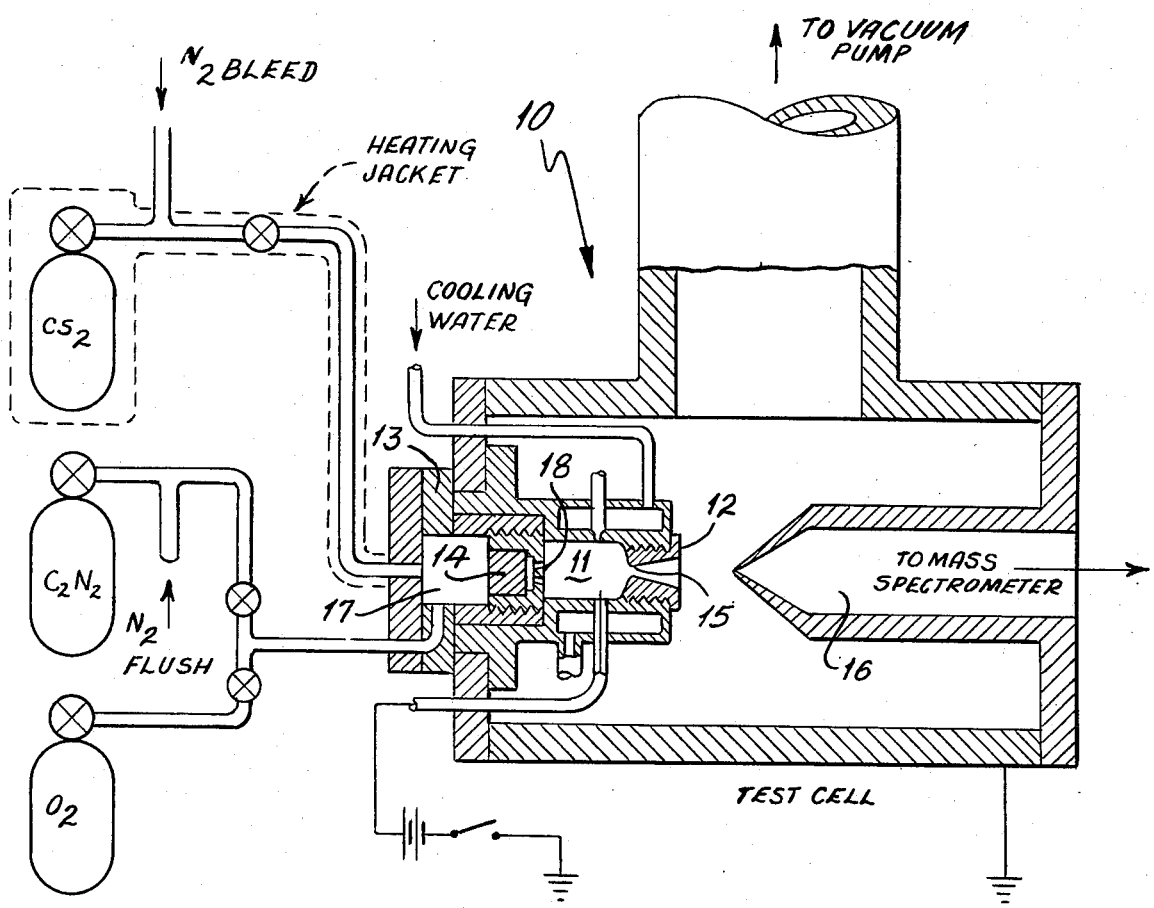

CARBON MONOSULFIDE GENERATING PROCESS

BACKGROUND OF THE INVENTION

Recent advances in the development of a carbon monoxide (CO) chain reaction chemical laser capable of high cw power output have created the need for an efficient method of generating large quantities of CS. In the CS fueled CO chemical laser, molecular oxygen ($O_2$) in combination with CS, produces a chemical chain reaction which results in the production of vibrationally excited CO. The CS molecule is stable in the gas phase; however, a heterogeneous process involving the recombination of CS to produce $CS_2$ on contact with a wall precludes accumulation and storage of large quantities of CS. Any practical large scale CS fueled CO chemical laser requires a CS generator as an integral component.

Present devices for producing CS rely on electrical power. These devices are inefficient and would be impractical for large scale lasers.

The most practical method of producing CS for CO chemical laser applications is by the thermal dissociation of $CS_2$. If the energy for the dissociation is provided by a thermochemical combustion process, large quantities of CS can be produced from a combustor unrestricted in size. However, additional chemical species generated by the thermochemical combustion process must not interfere with either the chemistry of the CO laser or cause significant degradation of optical gain produced in the CO laser.

Accordingly, a principal object of this invention is to provide a thermochemical combustor using a fuel-oxidizer flame and $CS_2$ to generate CS, the energy for the dissociation of $CS_2$ being provided by the high energy release of the flame. More specifically, an object of this invention is to provide a cyanogen ($C_2N_2$)—$O_2$ flame to thermally dissociate $CS_2$ to provide a source of CS fuel for a CO chemical laser.

In copending application of Jeffers et al Ser. No. 473,695 filed May 28, 1974 (now abandoned in favor of Continuation application Ser. No. 648,273), is disclosed a process and apparatus for a CO chemical laser CS-$CS_2$ fuel in which the CS is generated by DC glow discharges. These discharges provide CS/$CS_2$ in molar ratios from 0.3 to a practical level of 0.5. In copending application of Jeffers and Ageno Ser. No. 658,497 entitled CO Chain Reaction Chemical Laser is disclosed a chain reaction CO chemical laser using CS fuel. The present application provides a method of making substantial amounts of CS to use as fuel in the processes of said copending applications.

DESCRIPTION OF THE DRAWINGS

The FIGURE is a schematic representation of the apparatus used to produce CS in this invention.

DETAILED DESCRIPTION

In order to dissociate $CS_2$ and produce CS, a temperature of 2400 K or greater is necessary. A number of fuel-oxidizer-$CS_2$ gas mixtures produce the necessary adiabatic flame temperatures as well as satisfactory chemical equilibrium compositions. The fuel oxidizer mix chosen for demonstration is $C_2N_2$—$O_2$. Other suitable combinations include $C_2N_2$—$NF_3$; $C_2H_2$—$NF_3$; $Al/NF_3$; $N_2H_4$—$NF_3$; $N_2H_4$—$F_2$; $NH_3$—$NF_3$; $H_2$—$ClF_3$; $H_2$—$NF_3$; $CH_4$—$NF_3$; and $C_3H_8$—$NF_3$.

In addition to providing a sufficiently high temperature, the fuel-oxidizer-$CS_2$ system must be designed to generate as by-products only gases which do not adversely affect the laser operation of the CO chemical laser for which the CS is generated as fuel. The fuel oxidizers of the foregoing list meet both of these criteria.

This disclosure specifically concerns a $C_2N_2$—$O_2$ fuel-oxidizer system, but is equally applicable to the other fuel-oxidizer systems listed.

Critical features of this system are the CS mole fraction and the CS/$CS_2$ ratio.

Since $CS_2$ acts as a chain terminator in the CO chemical laser chain reaction, CS/$CS_2$ ratios greater than 2 are necessary for a practical device. Reactant $CS_2$ molar fractions of less than 33% produce CS/$CS_2$ ratios greater than 2.

Another variable is the concentration of $C_2N_2$ in the gas mixture. A $C_2N_2$ lean gas mixture yields unacceptably low CS concentrations. For the $C_2N_2$ rich flame, i.e., where $C_2N_2/O_2$ is about 1.2, larger CS concentrations and higher CS/$CS_2$ ratios are obtained at a lower temperature with less $CS_2$ reactant than for flames using stoichiometric amounts of $C_2N_2$ and $O_2$. A minimum $C_2N_2/O_2$ ratio is about 1.0. A maximum $C_2N_2/O_2$ ratio is about 1.3.

Carbon from the excess $C_2N_2$ apparently combines with the sulfur derived from the decomposition of $CS_2$ to produce CS, because there is a decrease in $S_2$ and S for the $C_2N_2$ rich versus the stoichiometric gas mixture. The optimum operating conditions for the $C_2N_2$-$O_2$ combustor were determined to be a $C_2N_2/O_2$ ratio of about 1.2 with about 0.2 molar fraction of $CS_2$ reactant. Mixtures much richer than $C_2N_2/O_2$ of about 1.2 produced large quantities of solid carbon.

The FIGURE shows a $C_2N_2$-$O_2$-$CS_2$ combustor which was constructed and used in producing CS and which was used to extract CS from the high temperature combustor plenum.

The combustor 10 is fabricated from 304 stainless steel and consists of a water-cooled plenum 11, a supersonic nozzle 12, an injector head 13 and an injector head plug 14. In the device used in this application, the plenum 11 dimensions are 1.0 cm i.d. by 1.5 cm long. The diameter of the nozzle throat 15 is 0.13 cm with a 19 to 1 area expansion ratio to produce a Mach 4 supersonic exit flow. The supersonic expansion (Mach flow greater than 1) is used to freeze the chemistry of the gas flow as much as possible and to reduce the static exit pressure to a level suitable for the mass spectrometer sampling probe 16. The Mach number normally is the range M = about 2 to about 5. The injector head 13 contains a small mixing chamber 17 where the $CS_2$ flow mixes with the $C_2N_2/O_2$ flow. A premixed gas feed system was chosen to insure a rapid approach to equilibrium in the combustor plenum 11. The injector head plug 14 contains a sintered metal filter which acts as a flashback arrestor and pressure snubber. The gas is injected into the plenum through four 0.089 cm diametr orifices 18.

The $C_2N_2$ was technical grade, 98.5% and the $O_2$ was extra dry grade, 99.6%, and both were used directly from their bottles without further purification. The $CS_2$ was reagent grade and was degassed before use. In order to achieve an adequate supply pressure for the $CS_2$, the bottle and supply lines were contained in a heating jacket and maintained at 100° C. The vacuum in the test cell was about 0.1 Torr.

The concentrations of CS, CO, $N_2$, and $CS_2$ were measured by the mass spectrometer sampling probe 16.

In operating the combustor device 10, the combustor flame was ignited by flowing all three gases ($C_2N_2$-$O_2$-$CS_2$) premixed into the plenum 11 and sparking the ignitor wire with a Tesla coil. Wall temperatures of 680° C. and 410° C. were measured by thermocouples for the downstream and upstream ends of the plenum, respectively. Mass flow measurements were considered accurate to ±2% for the $C_2N_2$ and $O_2$ flows and to ±10% for the $CS_2$ flow. For typical operating conditions the temperature in the plenum 11 was 2750 ≅ 500 K. This temperature was consistent with calibrated adiabatic flame temperatures and estimated heat losses due to conduction from the hot plenum walls to the cool test cell flange. Heat loss based on the observed plenum wall upstream and downstream temperatures and one dimensional heat conduction was calculated to be approximately 30 W. This typically represents a 10% loss of the available flow energy based on calculated adiabatic flame temperature and measured mass flow rates.

For input combustor flow of $C_2N_2$ = 1130 sccm, $O_2$ = 1000 sccm, and $CS_2$ = 305 sccm, the principal end products for these optimum flame conditions as measured by the mass spectrometer 16 are CO, $N_2$, CS and $CS_2$. Maximum CS/$CS_2$ ratios of 4 were observed and 20–30 weight percent of the exit stream is CS. Under stoichiometric $C_2N_2$—$O_2$ conditions, the observed mass scan confirms the expected presence of $S_2$ and diminished CS concentration. Finally, increasing $O_2$ sufficiently to oxidize the $CS_2$ results in the principal products of the $CS_2$-$O_2$ flame being $SO_2$ and CO. The chain reaction for $CS_2$-$O_2$ is completely independent of the $C_2N_2$-$O_2$ chain.

What we claim is:

1. A method of producing CS as an entity comprising the steps of heating $CS_2$ with a fuel-oxidizer flame in a system containing a fuel, an oxidizer and $CS_2$ to a temperature of at least 2400 K to produce a mixture of CS and $CS_2$, recovering the mixture from the system in a form in which the ratio of CS/$CS_2$ is at least 2 by passing the gases produced by the system through a nozzle in a supersonic expansion thereby to preserve the CS as an entity in the mixture for a predetermined period of time by means of said supersonic expansion, and employing said mixture to utilize said CS entity within said predetermined period of time.

2. The method of claim 1 wherein the fuel-oxidizer system is $C_2N_2$—$O_2$.

3. The method of claim 2 wherein the $C_2N_2$/$O_2$ ratio is more than about 1.0 and less than about 1.3.

4. The method of claim 1 wherein the molar fraction of the reactant $CS_2$ is less than about 33 molar percent in the input.

5. The method of claim 1 wherein the molar fraction of the reactant $CS_2$ is about 0.1–0.2.

6. The method of claim 1 wherein the fuel-oxidizer system is $C_2N_2$-$O_2$ and the ratio of $C_2N_2$/$O_2$ is about 1.1.

7. The method of claim 1 wherein the supersonic expansion flow is Mach 2 or more.

* * * * *